Oct. 19, 1954   L. K. FROLICH   2,691,877
CORN BUTTERING SPOON
Filed Aug. 14, 1952
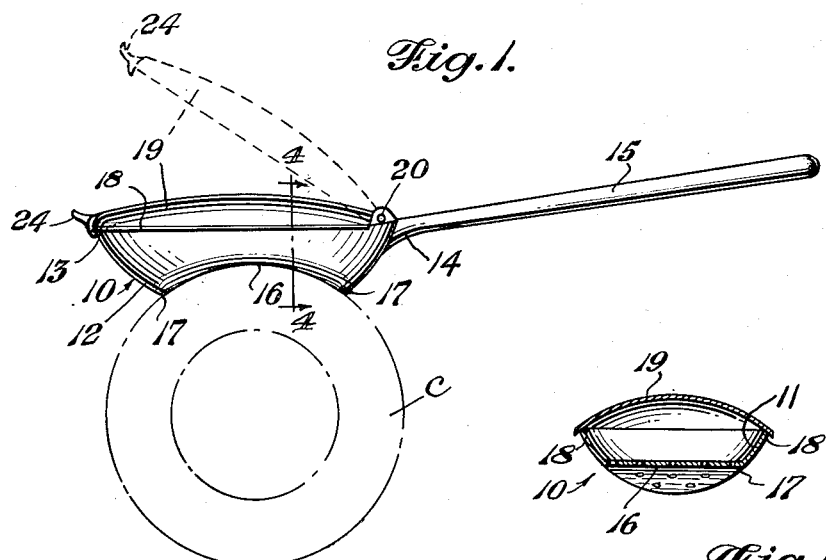
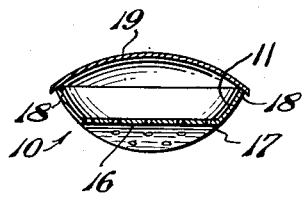
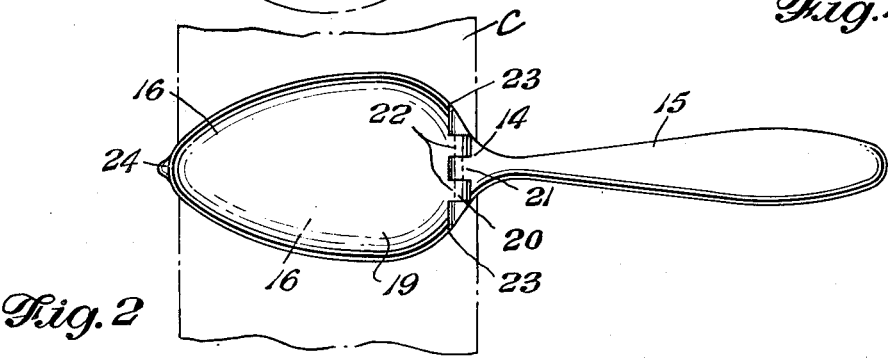
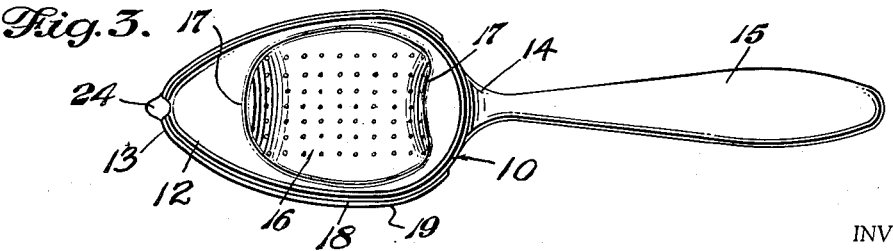
INVENTOR
Louise K. Frolich,
BY John E. Burch
ATTORNEY

Patented Oct. 19, 1954

2,691,877

UNITED STATES PATENT OFFICE 2,691,877

CORN BUTTERING SPOON

Louise K. Frolich, Kansas City, Mo.

Application August 14, 1952, Serial No. 304,297

1 Claim. (Cl. 65—12)

My invention relates to a corn buttering spoon and the object thereof is to provide a sample and novel spoon for the special purpose of easily, thoroughly and quickly applying butter to an ear of corn or corn on the cob.

The invention is embodied in a spoon, the bowl of which is concaved across the bottom with perforations and oppositely concaved ends to conform to the convex curvature of an ear of corn in swinging or moving the spoon and bowl thereof back and forth over the hot ear of corn from the handle thereof held in one hand while holding the ear of corn in the other hand so that the butter can be uniformly spread over the corn in buttering the same and avoiding spilling and wasting of the butter.

Another object of the invention is to provide a corn buttering spoon in which a piece or pat of butter is put in the perforated bowl thereof so that by applying the transversely perforated bottom of the spoon to the hot corn, the butter will melt to run and be spread evenly over the corn as the ear is turned to present the entire surface of the ear to the melted butter passing or flowing through the perforations.

A further object is to provide a cover for the spoon bowl which is attached so as not to come loose and preferably hinged at the back where the bowl and handle join and the handle extends from the bowl and has a clasp to engage over the tip of the bowl and hold the cover over the butter in the spoon bowl to prevent the butter from spilling out in careless handling of the spoon or corn, even if the spoon should happen to be turned on one side or reversed up-side-down on a side dish or plate and spilling of the butter on one's self or a tablecloth.

Other objects and advantages will be apparent as the description proceeds and the novel construction, combination and arrangement of parts pointed out, but it is to be understood that changes and modifications may be resorted to within the scope of the claimed invention without departing from the principles and spirit thereof.

In the drawing:

Figure 1 is a side elevation of corn buttering spoon of my invention in use on an ear of corn and showing the protective butter cover raised in dotted lines.

Figure 2 is a top plan view of the device as shown in Figure 1.

Figure 3 is a bottom view of the device, and Figure 4 is a cross section.

Referring to the drawing in detail, my corn buttering spoon comprises a bowl 10 concave on the top 11 and convex on the bottom 12 pointed toward the tip 13. At the back, the bowl is gradually tapered as at 14 to the shank of the handle 15, all as generally customary in a table spoon.

In accordance with the present invention, the convex bottom of the spoon bowl 10 is transversely reversely curved to form a concavity 16 which has a curvature substantially that of an ear of corn. In addition, the ridges of intersection 17 between concavity 16 and bowl 10 are curved convexly toward the center of the spoon forming an arc on one side or end and a softened "cusp" on the other. When the spoon is rubbed on an ear of corn, the natural movement of the hand holding the spoon causes the spoon to be swung in an arc, rather than being moved strictly parallel to the axis of the ear of corn. If the ridges of intersection 17 were straight, this arcuate movement would cause them to contact the ear at an angle to the axis of the ear, and thus lift the perforated concavity 16 out of contact with the ear. However, by reason of being curved, peaks 17 swing clear of the ear and concavity 16 rides evenly on the ear. Peaks 17 also permit the spoon to adapt itself better to ears of various diameters, whereas if lines of the ridges 17 were straight, the spoon would contact a small ear only at the center, or a large ear at the outside edges of the spoon. Accordingly, when a pat of butter is placed in the spoon, and melts from the heat of the corn, the butter flows through the perforations and is evenly and uniformly deposited on the kernels. The even distribution is assisted by the fact that the perforations extend slightly up the sides of the spoon.

In order to prevent the butter from spilling out or over the surrounding edge or rim 18 on account of careless handling of the spoon or corn, even if the spoon should be turned on one side or reversed up-side-down on a side dish or plate, accidentally or otherwise, a cover 19 is provided for the spoon bowl 10. The cover 19 is attached to the bowl and therefore will not come off or get lost, and as shown, is of concavo-convex formation and conforms to the shape of the bowl 10 in plan and may be of the same size as the rim 18 or slightly larger so as to conform thereto and close the joint between the rims or surrounding edges thereof substantially tight. As shown, the cover 19 is mounted on the bowl to open and close and for this purpose, is hinged at the back as at 20 to the bowl, through the medium of ears 21 on the bowl and ears 22 on the cover on a transverse line 23 as the chord of an arc. At the tip or more pointed end of the ovate or egg shaped cover 18 shaped like or conforming to the rim of the bowl 10, said tip is provided a spring clasp or catch 24 to resiliently engage or spring over the tip of the spoon bowl 10 and hold the cover closed over the open top of the bowl. In this way, the cover may be readily flipped open to permit a piece or pat of butter of suitable size to be scooped or placed therein and then after closing the cover and engaging the catch 24 with the tip of the bowl, the device is applied to the hot or warm ear of corn C as shown in Figure 1 of the drawing. The heat of the corn will thus melt the butter which will pass or flow through the holes or perforations and by moving the spoon back and forth over the ear of corn while turning or revolving the latter, the butter will be evenly applied or distributed over the ear of corn. Moreover, the butter will not fall or spill out even if the spoon is carelessly handled or turned over and therefore, will not be wasted or spilled onto one's clothing or a table cloth.

Having thus described my invention, what I claim is:

A spoon for buttering corn comprising a bowl of greater axial length than width, a reentrant curved bottom in said bowl extending transversely of said axial length of said bowl and intersecting the bowl surface and said reentrant surface having an external curvature substantially conforming to the convex curvature of an ear of corn, the central portion of said surface being cylindrical, but the end portions of said surface being flared away from the cylindrical form at opposite sides of said cylindrical portion and forming rounded peaks, said peaks being blended into cusps at the ridge of intersection of the surface of the spoon bowl with the reentrant bottom surface, and perforations extending over the entire concave bottom of said bowl through which melted butter is adapted to flow onto the ear of corn.

References Cited in the file of this patent

UNITED STATES PATENTS

| Number | Name | Date |
|---|---|---|
| D. 157,183 | Newell | Feb. 7, 1950 |
| 433,546 | Smith | Aug. 5, 1890 |
| 1,044,869 | Emmenegger | Nov. 19, 1912 |
| 1,073,081 | Jacobson | Sept. 9, 1913 |
| 1,097,465 | Pratt | May 19, 1914 |
| 1,253,917 | Wern | Jan. 15, 1918 |
| 1,334,169 | Royer | Mar. 16, 1920 |
| 2,527,149 | Peterson | Oct. 24, 1950 |

FOREIGN PATENTS

| Number | Country | Date |
|---|---|---|
| 8,461 | Great Britain | Apr. 27, 1893 |